United States Patent [19]

Bubik

[11] 4,357,977
[45] Nov. 9, 1982

[54] BEAD BREAKING MECHANISM
[75] Inventor: Leslie Bubik, Toronto, Canada
[73] Assignee: FMC Corporation, Chicago, Ill.
[21] Appl. No.: 122,326
[22] Filed: Feb. 19, 1980
[51] Int. Cl.³ .......................................... B60C 25/06
[52] U.S. Cl. .................................................. 157/1.28
[58] Field of Search ................ 157/1.17, 1.24, 1.26, 157/1.28

[56] References Cited
U.S. PATENT DOCUMENTS

| | | | |
|---|---|---|---|
| 3,008,512 | 11/1961 | Foster | 157/1.28 |
| 3,032,094 | 5/1962 | Bishman | 157/1.28 |
| 3,158,190 | 11/1964 | Foster | 157/1.17 |
| 3,246,681 | 4/1966 | May | 157/1.28 |
| 3,581,796 | 6/1971 | Alm | 157/1.28 |

Primary Examiner—James G. Smith
Attorney, Agent, or Firm—H. M. Stanley; R. B. Megley

[57] ABSTRACT

A tire changing apparatus is provided in which a lower bead-breaking shoe is pivotally mounted on a lever arm at one distance from the lever fulcrum and in which power is transmitted to the lever arm at a greater distance from the lever arm fulcrum. The bead-breaking shoe is of such a form that the leading edge of the shoe meets the wheel rim with its centerline spaced therefrom and engages the tire bead at substantially the leading edge centerline, thereafter engagement expanding progressively about the tire bead perimeter.

21 Claims, 13 Drawing Figures

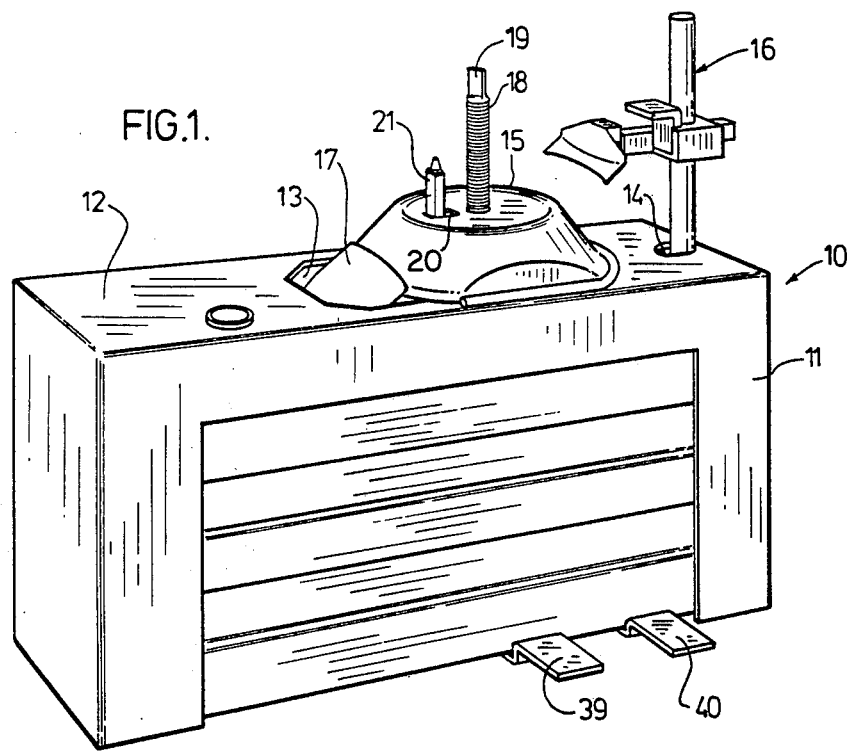
FIG.1.
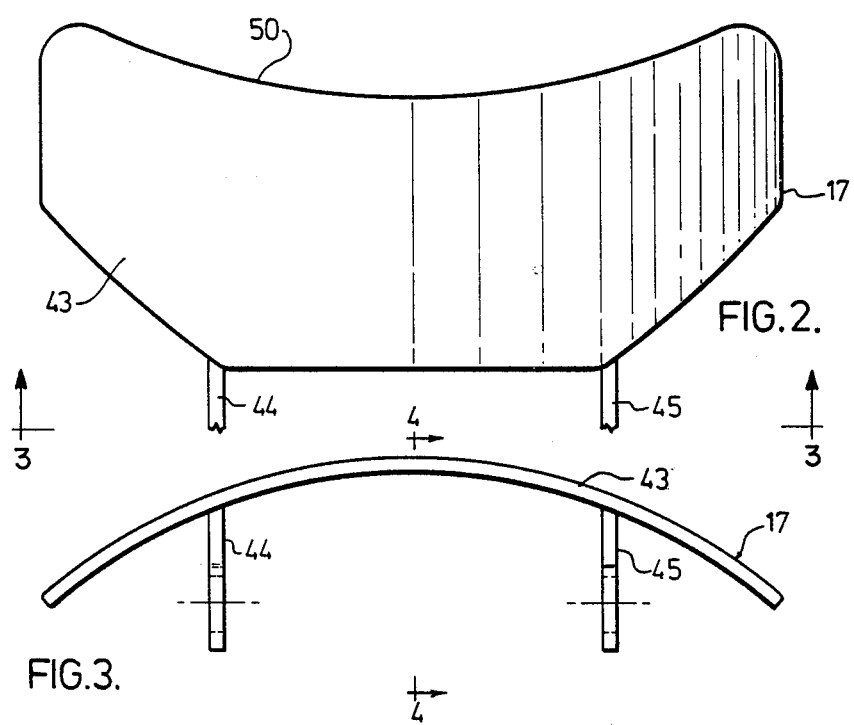
FIG.2.
FIG.3.

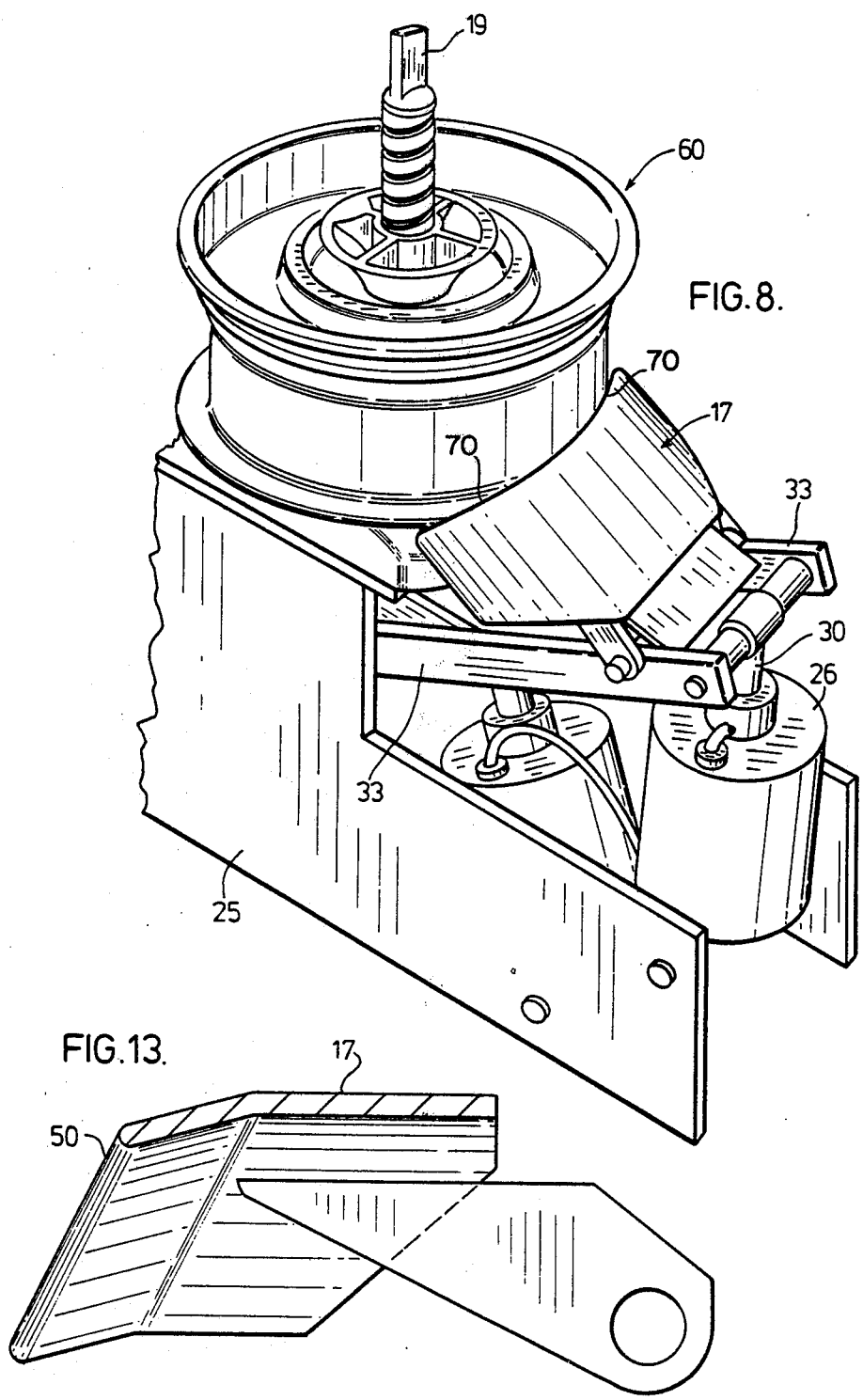

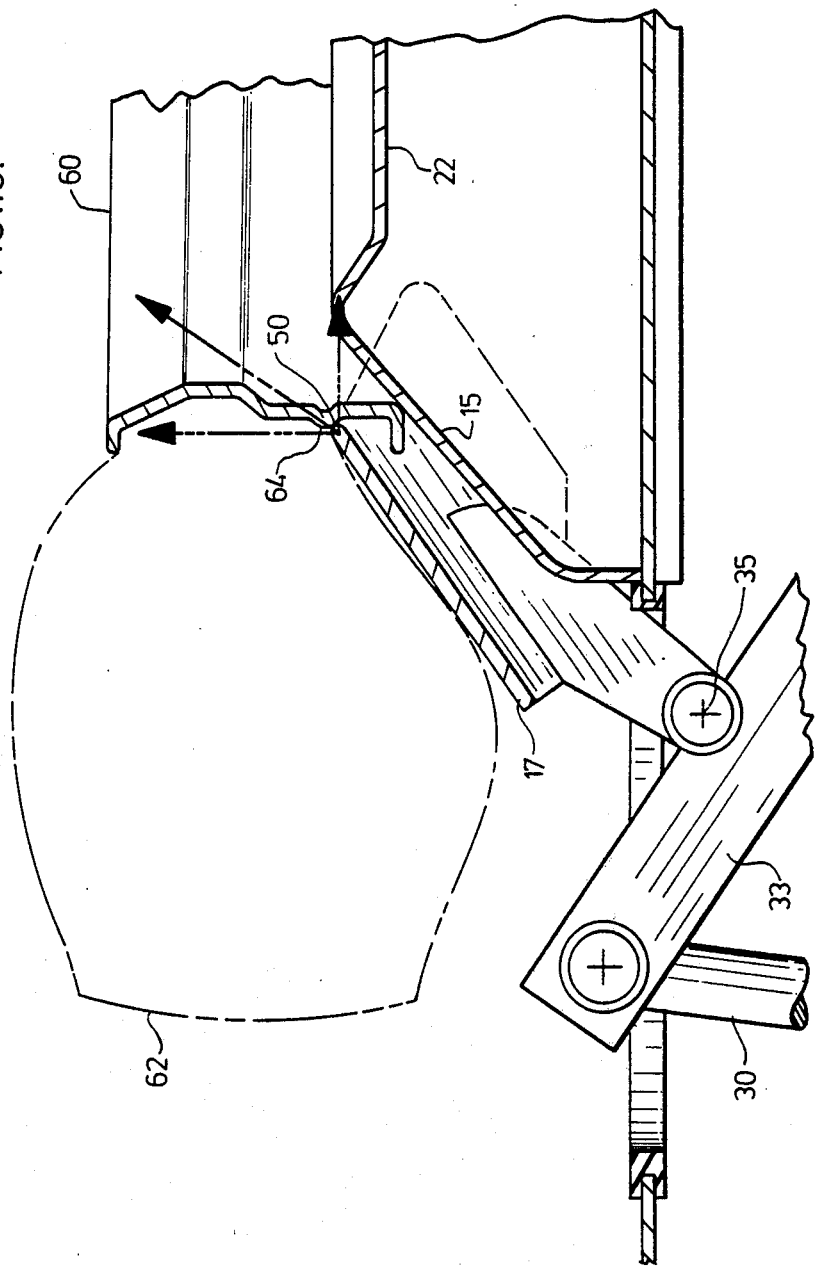

BEAD BREAKING MECHANISM

BACKGROUND OF THE INVENTION

This invention relates to tire-changing machines and more particularly to such machines in which the wheel is mounted on a table and the tire bead is broken by a pair of oppositely acting bead-breaking shoes.

There have always been problems with the lower bead-breaking shoe.

In normal operation with certain machines of the prior art the wheel rim with tire mounted is seated on a table. The table top is either sloped or curved to accomodate various diameters of wheels. The wheel sits on this top with a lower rim projecting laterally therefrom. When the tire to be changed is mounted on the table top the lower bead-breaking shoe is obscured from the operators view by the tire itself.

The result has been that these shoes of the prior art, in their bead-breaking motion, if the attitude of the shoe is not set properly, will engage the wheel rim or a structure known as a safety hump on the wheel well wall.

This engagement may stall the operation of the machine or result in bending or breaking of the wheel rim or the wheel.

Present day tires and wheels are provided with many contours and sizes.

The advent of the radial tire with its different structure and profile makes such tires difficult to remove from wheel rims.

The wheels, particularly alloy wheels, are softer and more susceptible to damage because of their width and composition.

The wider rims are more difficult not to engage. In certain mechanisms of the prior art it was proposed that the movement of the lower shoe be at a constant distance from the table top; in some structures such as the Foster U.S. Pat. No. 3,158,190 two shoes were provided. These mechanisms assumed that the operator set the lower bead-breaking shoe at the correct attitude so that there was no engagement with the rim.

However, frequently, if the shoe does not engage the rim it does not engage the bead at the correct angle.

It should be understood that the most efficient engagement of the shoe with tire to effect bead-breaking is at the junction of the bead and the wheel rim. If the shoe engages the tire on the side wall the bead-breaking energy is dissipated or absorbed by the flexible characteristics of the side wall. And if the shoe engages the side wall first then it will through the friction of the side wall be engaged and remain engaged in the attitude at which it initially engaged.

The absorption of the bead-breaking shoe force by the rubber of the tire is a problem with all forms of bead-breaking shoe and in the past the configuration of the shoe itself has not assisted.

As a consequence of the dissipation of the bead-breaking force by the rubber absorbing the energy there has been an increased need to provide power to overcome the energy loss.

In U.S. Pat. No. 3,158,190 the problem of two-ply tires is discussed. With radial tires the difficulties are increased and with the increased cost of such structures damage to the side wall has to be minimized while at the same time more power has to be provided which is more effectively employed.

As mentioned previously the shoe itself has been of minimum assistance in what may be termed the delivery of the bead-breaking force.

Generally, the shoes of the prior art are of such a form that there is substantially simultaneous engagement of the leading edge of the shoe about an arc of the bead. As a result the bead-breaking force is delivered about an extended area of the perimeter of the bead and the force is substantially vertical about that area. This type of force application again results in the stalling of machines. This stalling in certain machines can result in a "whip-lash" effect with the result that an operator frequently finds himself subject to assault by the tire iron used to remove the tire.

SUMMARY OF THE PRESENT INVENTION

It is the principal object of the present invention to provide a tire-changing machine which is safe to operate; which delivers a bead-breaking force through a bead-breaking shoe more efficiently than those shoes of the prior art; and has a more efficient bead-breaking shoe actuating mechanism than those mechanisms of the prior art.

In accordance with one aspect of the invention a tire changing machine includes a framework to which is pivotally attached a bead breaker lever. A bead breaker driver is coupled to move the lever and a bead breaker shoe is pivotally attached to the lever. A wheel rim support table is supported on the framework and is adapted to receive and support wheel rims thereon. The support table is positioned so that the bead breaker shoe is reciprocally driven past the support table by the driver. The combination further includes an inwardly and upwardly sloping support surface on the rim support table which has a maximum radius at the lower edge thereof. A leading edge on the bead breaker shoe is disposed adjacent to the support surface and has a radius of curvature which is larger than the support table maximum radius. The leading edge has a center of curvature which is disposed on the side of the rim support table center of curvature which is remote from the leading edge. An inwardly and upwardly sloping upper surface is formed on the bead breaker shoe wherein the upper surface has a radius of curvature which is less than the maximum radius of the support surface as it appears in a plane normal to the upper surface. In this fashion the lateral extremities of the shoe may ride on the support surface and the center of the shoe leading edge is spaced therefrom.

In another aspect of the present invention a tire changing machine includes a framework, a bead breaker lever pivotally connected to the framework, a lever driver coupled to move the lever about the pivotal connection, a bead breaker shoe pivotally attached to the bead breaker lever at a position thereon which is spaced from the pivotal connection, and a wheel rim support table which is mounted on the framework in a position so that the bead breaker shoe is driven in reciprocal motion past the support table by the driver. The combination further includes means for pivotally connecting one end of the lever driver to the framework and means for connecting the other end of the lever driver to the lever at a distance from the frame and the lever pivotal connection which is greater than the distance between the frame and the lever pivotal connection and the position on the lever where the bead breaker shoe is attached.

These and other features of the present invention will be more fully understood from the following description and drawings in which various embodiments are described by way of example and in which:

FIG. 1 is a general view of a tire changing machine embodying the present invention;

FIG. 2 is a plan view from the top of a bead-breaking shoe in accordance with the present invention;

FIG. 3 is an end elevation of the bead-breaking shoe of FIG. 2 taken along the line 3—3;

FIG. 8 is a general partial view illustrating the relationship between a bead-breaking shoe and a wheel rim with tire removed;

FIG. 10 is a further general partial view partly in section of a bead-breaking shoe in the course of its bead-breaking action and serves to illustrate the preferred angle of attack of the bead-breaking shoe to the wheel rim;

FIG. 13 is a side sectional elevation of an alternate embodiment of a bead-breaking shoe in accordance with the present invention;

Figure 9:
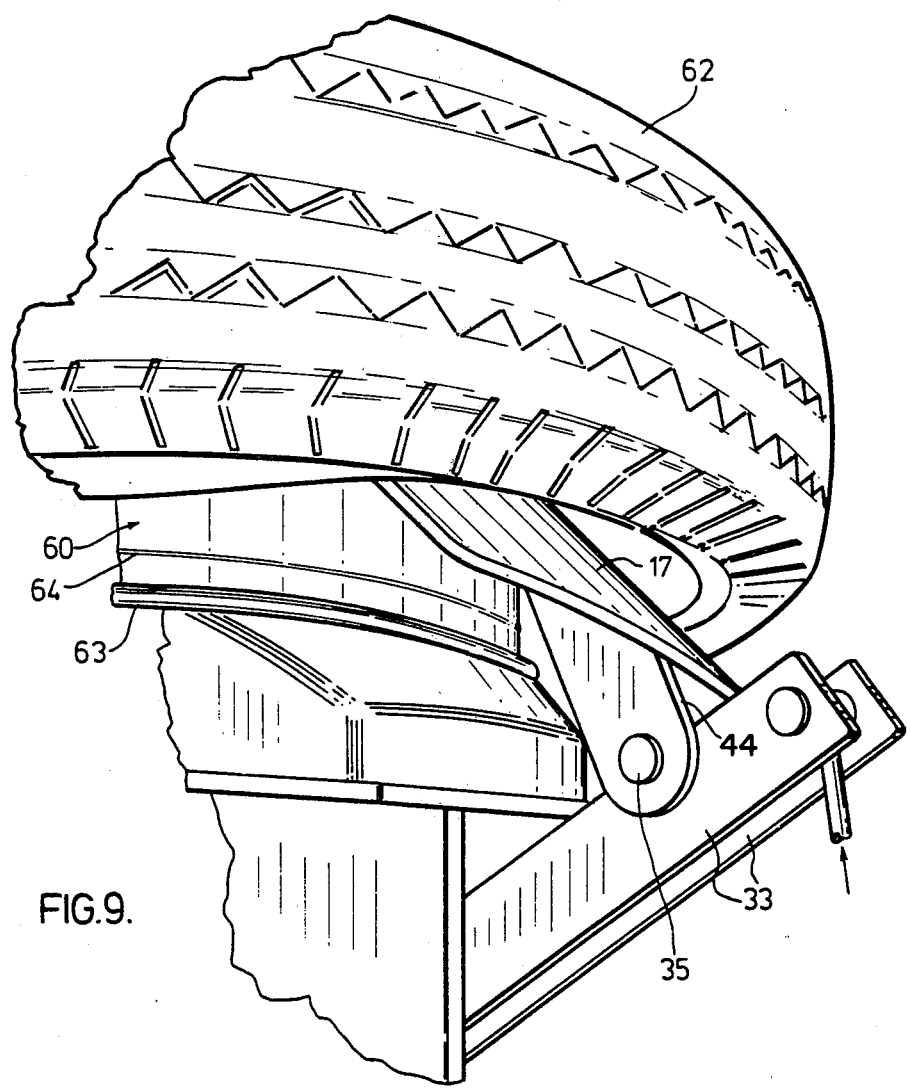
FIG. 9 is a partial general perspective view from the underside of a tire in the process of being removed from a wheel rim and serves to illustrate the action of the shoe on the tire.

FIG. 1 illustrates a general perspective view of a tire-changing machine 10 embodying the present invention. These machines generally comprise a frame, not shown, which is covered by a shroud 11 with a top plate 12 with suitable openings 13 and 14 through which extend a wheel rim receiving platform 15 and an upper bead-breaking mechanism 16.

In this embodiment of the invention a lower bead-breaking shoe 17 also extends through opening 13.

From the centre of the wheel rim receiving platform 15 a post 18 extends upwardly. In most machines this post is provided with a thread and a central rotatable shaft 19. Also projecting upwardly though a further opening 20 is a rim-locating pin 21.

Figure 5:
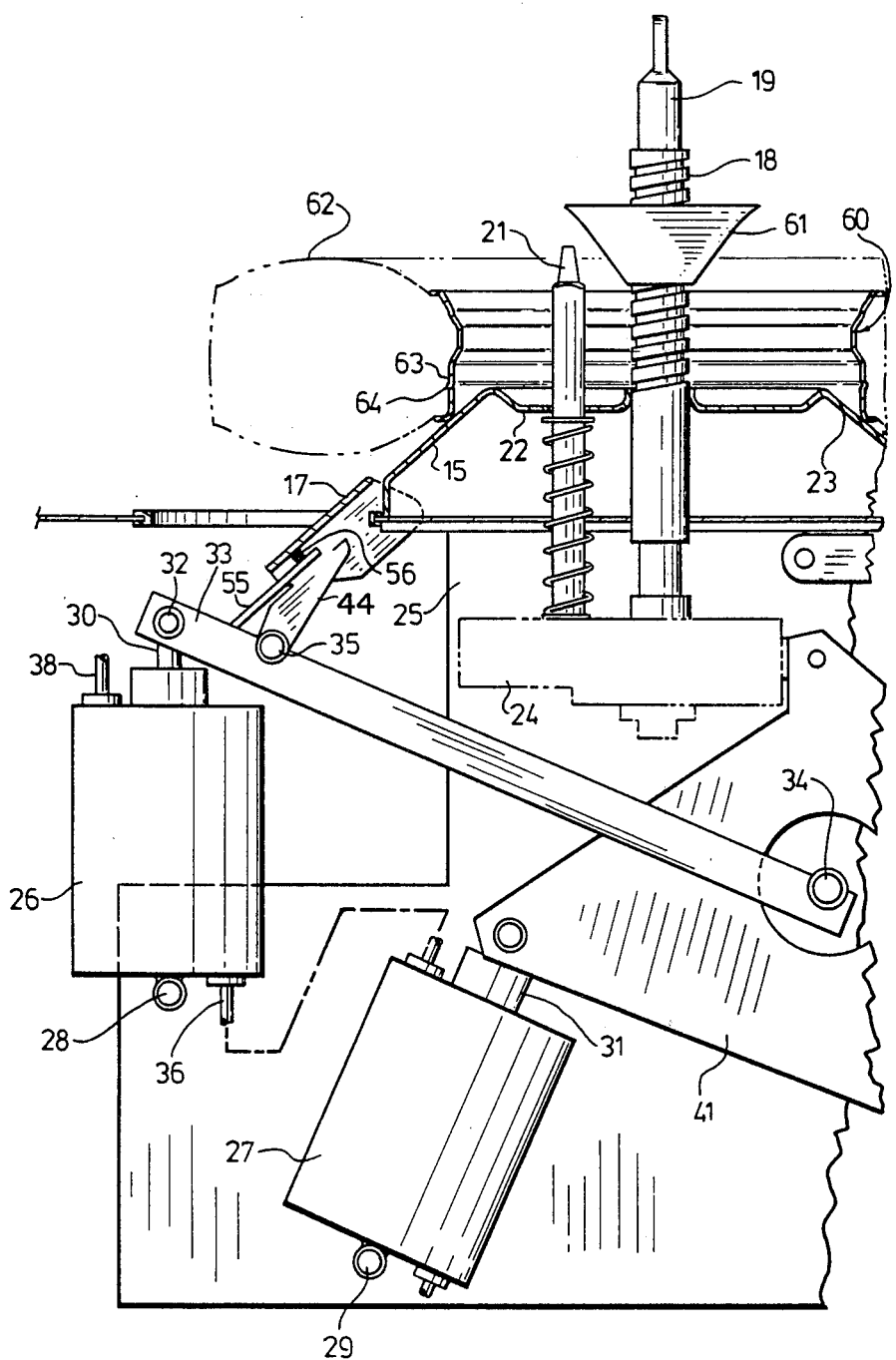
FIG. 5 is a partial general schematic view partly in section of the interior of the machine illustrated in FIG. 1 and serves to illustrate the general relationship between the wheel rim, the tire in phantom outline, and a wheel prior to beginning the tire removal operation.

As shown in FIG. 5 the wheel receiving platform 15 comprises a rigid generally inverted pan-shaped structure with a dished top surface 22 and sloping side walls 23.

These sloped side walls serve to permit wheel rims of different diameters to be seated on the wheel-receiving platform 15.

Part of a frame which supports the shroud and operating mechanism is indicated at 25 in FIG. 5.

Locating pin 21, threaded shaft 18 and post 19 are mounted on a bracket 24, shown in phantom outline in FIG. 5. This bracket 24 also supports a rack gear which engages a pinion gear on the bottom of post 19 and serves to turn post 19 during a bead removal step.

On wheel-receiving platform 15 a wheel 60 is seated and secured by a threaded cone 61 to restrain it from movement. For clarity a tire 62 mounted on wheel 60 is shown in phantom outline in this view. The rim of wheel 60 is indicated at 63. In most wheel structures, particularly those used for tubeless tires a safety hump or lip is provided. One such safety lip is indicated at 64.

On frame 25 a pair of air/hydraulic cylinders and pistons 26 and 27 are pivotally mounted as at 28 and 29 respectively. Pistons 30 and 31 are operated in a reciprocal manner by power supplied from either a surge tank, not shown, or any other equivalent power source.

Piston 30 is pivotally connected, as at 32, at its upper end to one end of a pair of bead-breaking shoe support arms or levers 33.

The remote or inner end of levers 33 are pivotally connected to the frame 25 at 34 and the levers are fixed to move together and extend between pivots 32 and 34. The bead-breaking shoe 17 is pivotally mounted as at 35 adjacent to inboard of pivot 32 as seen in FIG. 5.

It has been found that the mounting arrangement wherein the drive force from piston 30 is applied at a greater lever arm from the pivot 34 for the levers 33 substantially increases the power available in the shoe as compared to structures commonly employed in the prior art. In all prior art structures known to the applicant the connection between the power source and the bead-breaking lever arm has been such that the shoe is mounted on the drive lever outboard of the applied power. This arrangement has led to the use of greater capacity cylinders and pistons; this in turn has led to larger frames and the result has been a larger more expensive machine.

Cylinders 26 and 27 are air/hydraulic and are coupled to each other by hose 36. A hose 38 connects an air pressure source, not shown, to the cylinder 26 and both cylinders are controlled in a conventional manner by foot pedals such as 39 and 40 in FIG. 1.

Cylinder 27 and its piston 31 operate reciprocally with respect to cylinder 26. Piston 31 is connected pivotally to arm 41 which actuates the upper bead-breaker 16 and the central post drive gears, not shown.

Shoe 17 as mentioned previously is pivotally connected to arms 33 at 35. As shown in FIGS. 2 and 3 shoe 17 comprises a curved plate 43 the edge of which has curvature in two planes and which is supported by a pair of spaced apart brackets 44 and 45 through which a pin or axle passes to effect pivotal mounting on arms 33 as shown in FIG. 5.

Figure 4:
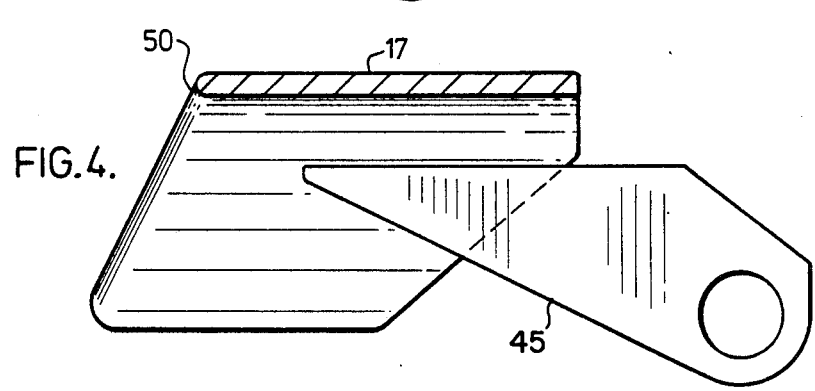
FIG. 4 is a side sectional elevation of the shoe illustrated in FIGS. 2 and 3 taken along line 4—4 of FIG. 3.

Shoe 17 has a leading edge 50 which is rounded as is shown in FIG. 4.

The leading edge of the shoe, upon movement imparted by the driving cylinder and piston assembly 26, describes a locus which defines an arc of a cylinder inclined to a cylinder of the wheel rim 60 wherein the center axes of the cylinders intersect.

In the preferred embodiment the radius of curvature of the leading edge 50 in a first plane is in the range of 18″ (FIG. 2). This radius ensures that the radius of the leading edge exceeds the radius of the largest wheel rim diameter contemplated to be used on the machine.

Figure 11:
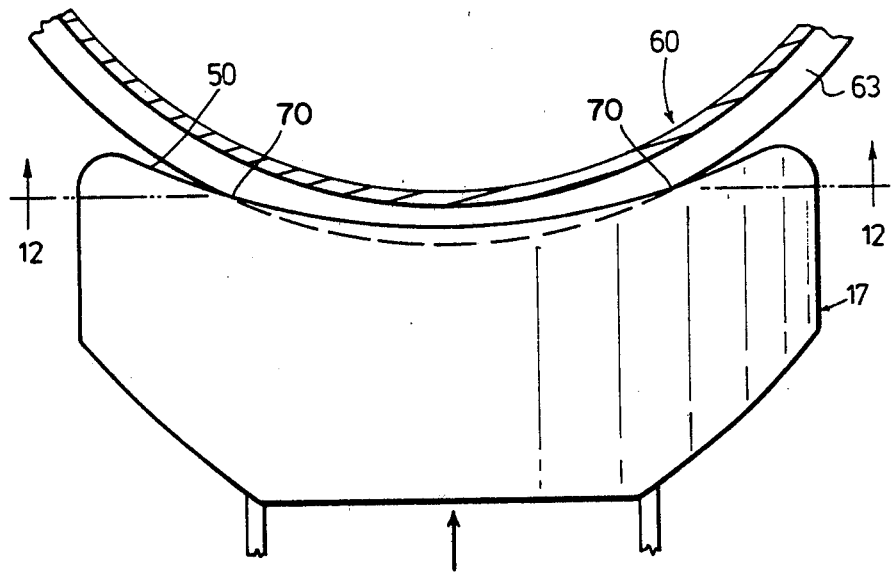
FIG. 11 is an enlarged plan view partially in section illustrating the relationship between a bead-breaking shoe in accordance with the present invention and a wheel rim.

It may also be seen in FIG. 11 that the center of curvature of the leading edge 50 of the shoe 17 is on the side of the center of curvature for a wheel rim 60 (and therefrom the rim receiving platform 15 which is concentric with the rim as seen in FIG. 5) which is away or remote from the leading edge. If a larger wheel rim diameter is to be employed then the shoe leading edge radius should be greater than such a wheel rim radius.

Shoe 17 also has a radius of curvature in a second plane as is evident from FIG. 3. In the preferred embodiment this radius of curvature is of the order of 14 inches. It has been found that this radius accommodates most wheel rim sizes and diameters.

The shoe thus functions to contact the tire bead initially at a center area on the shoe to provide higher force per unit area to effect initial bead breaking action.

As shown in FIG. 5 shoe 17 may be provided with an attitude adjustment mechanism which comprises a plate 55 rigidly secured across levers 33 and projecting upwards under the rear part of the shoe. A threaded screw or pair of screws such as 56 make threaded engagement with plate 55 and they by contact with the underside of the shoe and their adjustment up and down vary the attitude of shoe leading edge 50.

This adjustment provides selectivity in the angle of attack of the bead breaker shoe 17 relative to the lower tire bead where adjustment of the angle is necessary. The adjustment may provide an increased vertical component (parallel to the wheel axis) in the bead breaking force applied by the shoe.

As shown in FIG. 10 the angle of attack of the leading edge 50 of the shoe 17 to the wheel rim is preferably in the range of between 50° and 60° and maximum efficiency has been found at 56°.

Steeper angles (over 60° from horizontal) tend to collapse the side wall without breaking the bead from the rim and shallower angles (less than 50° from horizontal) tend to produce too high a horizontal force component from the shoe.

OPERATION

Prior to mounting the wheel and tire on the machine the operator may make minor adjustments to the attitude of the shoe 17 by screw 56 although in most cases this adjustment is not necessary. The wheel rim 60 with the tire 62 which is to be removed is placed on the wheel-rim receiving platform or support 15 and secured in position by the cone 61.

Power is then supplied to cylinder 26 and piston 30 is extended. Before the power is applied it will be observed from FIG. 5 and FIG. 1 that the leading edge 50 of the shoe 17 normally extends above the lower limits of the wheel rim support platform 15.

Because of the curvature of shoe 17 shown more particularly in FIG. 3, the shoe may initially ride on the surface of the wheel rim support platform out toward the lateral edges or "wings" of the shoe. The screw 56 may of course be adjusted so that the shoe 17 does not contact platform 15.

As power is applied and piston 30 is extended support arms 33 are pivoted about pivot 34 and shoe 17 moves up over the surface of the wheel rim support platform 15.

Figure 6:
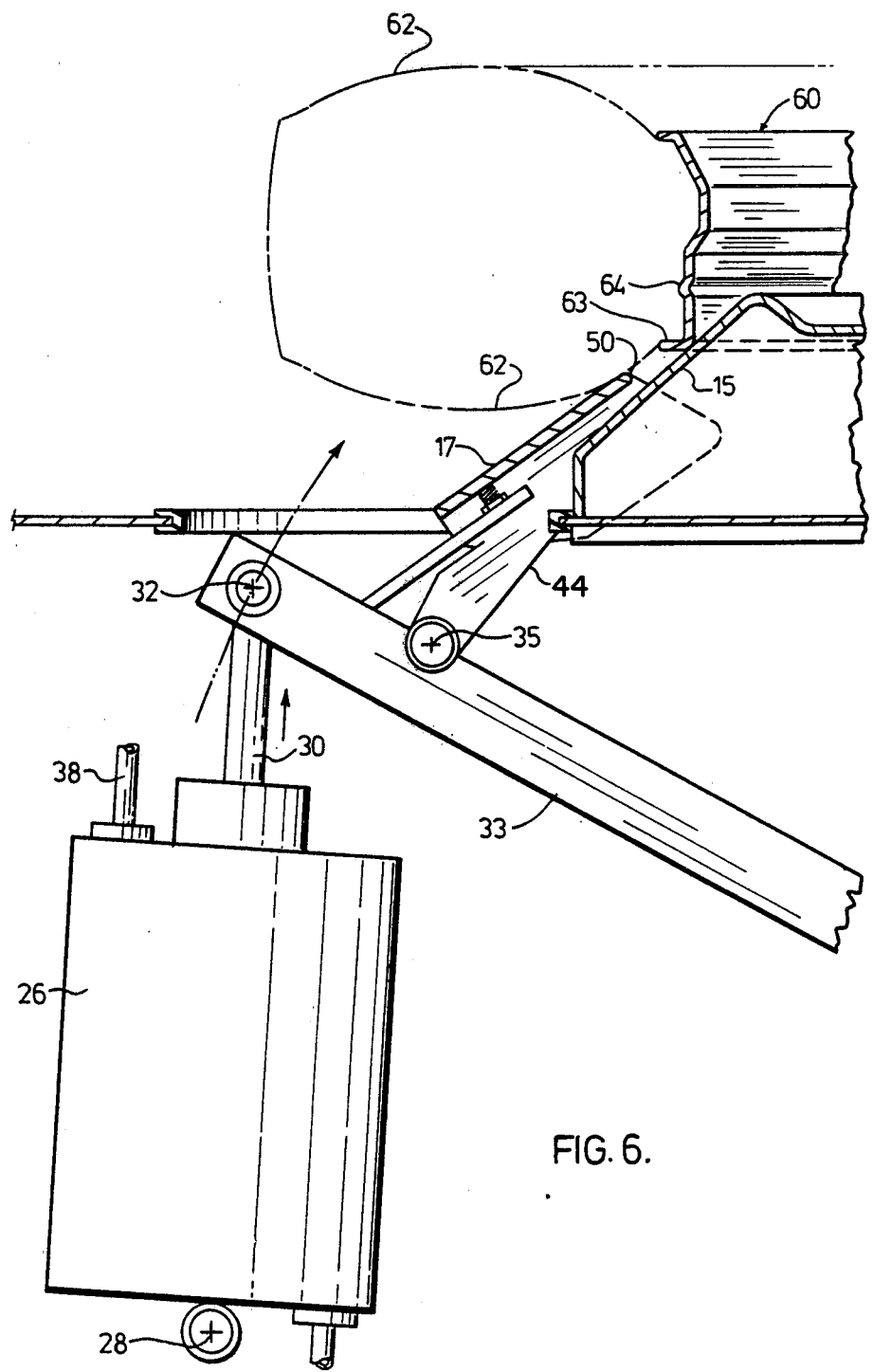
FIG. 6 is an enlarged schematic view partly in section of the bead-breaking shoe just as it makes contact with the tire during bead-breaking.
Figure 7:
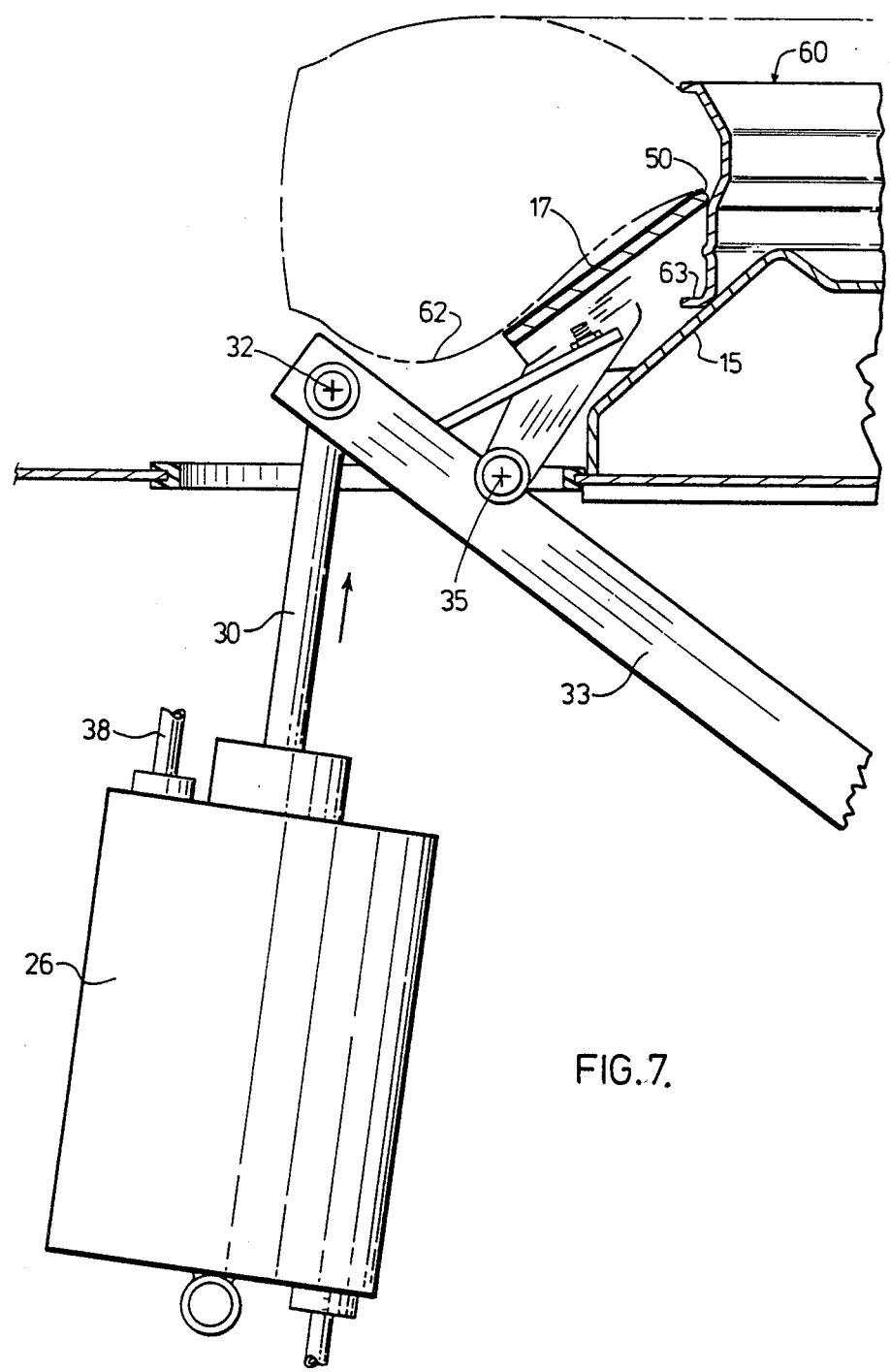
FIG. 7 is a schematic view partly in section which serves to illustrate the relationship of the bead-breaking shoe, wheel rim, and tire at the end of the travel.
Figure 12:
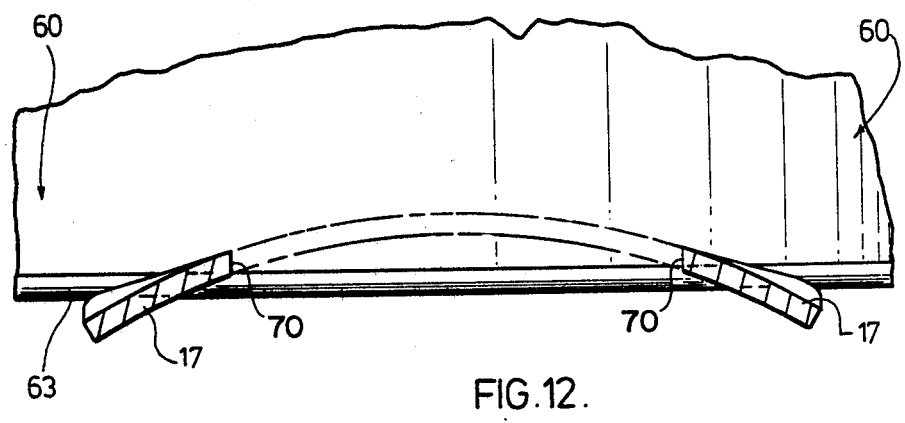
FIG. 12 is a section taken along line 12—12 of FIG. 11 and is an end section of that shoe and again serves to illustrate the relationship of a shoe in accordance with the present invention and a wheel rim.

As the curved leading edge 50 of shoe 17 approaches the rim the uppermost or adjacent position of the shoe 17 will be spaced apart from the rim as shown in FIGS. 6, 11 and 12.

Initially the shoe leading edge 50 contacts the tire side wall 62 in the manner shown in FIG. 6. At that point the relative positions of the shoe 17, and rim 63 are perhaps more clearly shown in FIGS. 11 and 12 where the tire 62 has been omitted from the views. As shown the centerline of the leading edge 50 is spaced apart a short distance from the rim and in this case the distance or spacing by virtue of the horizontal radius, that is the radius in the aforementioned second plane shown in FIG. 3, is greater than the width (distance the rim extends in a generally horizontal direction from the rim support platform) of any wheel rim expected to be encountered in normal operation, so that there is no engagement with the wheel rim at this centerline point. The shoe contacts the rim at points 70 (FIGS. 8 and 11) laterally displaced from the shoe centerline toward the "wings". The shoe attitude or angle is preferably within the aforementioned 50° to 60° range as determined by setting of the adjustment screw 56 or as determined by the riding of the "wings" of the shoe on the rim support platform initially. Frequently, with shoes of the prior art the centerline of the shoe leading edge may be found to engage the wheel rim and if the operator does not realize this the rim may be irreparably bent.

The view in FIG. 8 which shows shoe 17 part way through its travel further illustrates the relationship between the wheel rim and the shoe leading edge without being obscured by a tire.

As will be evident from FIGS. 7, 8, 11 and 12 the leading edge 50 of shoe 17 as the shoe moves upwardly crosses over the wheel rim 63 at an angle so that the shoe cannot catch on the rim and there is no motion resisting contact between the rim and the shoe.

After the initial contact shoe 17 may, because of the nature of rubber and the coefficient of friction between steel and rubber, bind and remain in its initial contact position with side wall 62.

To minimise this possibility the leading edge 50 may be polished and may be inclined with respect to the remainder of the shoe upper surface as shown in FIG. 13.

When the shoe 17 stays in the initial contact position that position will be adjacent the wheel rim 63. A high pressure exerted by the shoe will be exerted on the tire in the vicinity of the bead since the initial contact is over a very limited area due to the curved form of the shoe and the aforementioned high unit force per unit area.

As the piston 30 is further extended due to the engagement of the leading edge 50 with the tire the attitude of the shoe will change slightly with the shoe leading edge moving upward (rotating counterclockwise in FIG. 7) relative to support arms 33.

As the shoe 17 continues to move up, the leading edge 50, on what may be considered as the lateral trailing or wing portions move upward in contact with the wheel rim 63.

The points of contact 70 continued to migrate outwardly toward the wing extremities.

As mentioned previously the radius shown in FIG. 2 was chosen so that it would exceed the radius of the largest wheel rim from which a tire was to be removed. Thus, as the leading edge 50 moves upward it crosses the wheel rim perimeter at the two points 70 located on a line extending chordally of the rim and the shoe is inclined thereto.

The result of this action may be more clearly understood from the underside view shown in FIG. 9 where the tire 62 is being peeled from the wheel rim 63, and the bead is being urged upwardly and the area over which bead breaking force is applied expands laterally in both directions from the shoe centerline along the bead perimeter.

It has been found that in contrast to the substantially vertical motion of the prior art shoes this lateral progression of application of the bead breaking force makes for easier separation of a tire from the rim.

With the bead broken it is necessary for the shoe travel to be maintained so that the bead may be broken further along the periphery of the wheel rim. During this travel after breakage the shoe 17 will normally move into the drop center of the wheel and during this engagement meets the safety hump 64. The shoes of the prior art since they apply a proportionately large horizontal force component will frequently bind and the machine may stall.

The leading edge 50 of shoe 17 will meet the safety hump 64 at the center portion of the shoe as it travels upwardly. Due to the proportionately large vertical force component applied by the shoe 17 configured as disclosed herein, the rounded leading edge 50 readily passes the safety hump and the shoe continues its travel to strip the tire bead from the rim 63.

The configuration of the shoe 17 and the means of applying power to the shoe support arm outward of the shoe mounting each contribute to the efficiency of the machine provided. The bead breaker shoe disclosed provides easy shoe-rim passage, avoids tire sidewall buckling, provides ready shoe safety hump passage, allows shoe actuation without shoe attitude adjustment and concentrates bead breaking force initially over a small area to thereby avoid rim damage and avoid stalling the bead breaker motion. However, it will be understood that these individual features may themselves contribute to the efficiency of other machines and other modifications may be made to the embodiments described without departing from the invention. It will be understood that while shoe 17 is described in association with a lower bead-breaking mechanism it may with suitable mounting be used on an upper bead-breaking mechanism.

The embodiments of the invention in which an exclusive property or privilege is claimed are defined as follows:

1. For use in a machine for removing a vehicle tire from a wheel rim, a bead-breaking shoe adapted to ride over a wheel rim together with a rim support table for mounting the wheel rim, said shoe comprising a leading edge and an upper surface on the bead breaking shoe, said leading edge being curved about a vertical axis and said upper surface defining a curve about an axis downwardly inclined to said vertical axis, said rim support table having a lower portion having a radius which is less than the radius of the curve of said leading edge and which is greater than the curve about said axis downwardly inclined to said vertical axis, said leading edge having a center of curvature which is on the side of said rim support table center of curvature which is remote from said leading edge, and means for pivotally mounting said shoe.

2. A bead-breaking shoe as claimed in claim 1 wherein said leading edge defines an arc of a circle having a radius of substantially 18 inches.

3. A bead-breaking shoe as claimed in claims 1 or 2 wherein said upper surface of said shoe defines an arc of a circle having a radius of substantially 14 inches.

4. A bead-breaking shoe as claimed in claim 1 wherein said leading edge is symmetrically curved and defines a pair of trailing wings.

5. A bead-breaking shoe as claimed in claim 1 wherein said leading edge of said shoe defines an arc having a radius in excess of the wheel rim radius from which said tire is to be removed.

6. A bead-breaking shoe as claimed in claims 1, 4 or 5 wherein said leading edge of said shoe is disposed at an elevation angle in the range 50°–60°.

7. For use in a machine for removing a vehicle tire from a wheel rim being serviced, a rim-seeking bead-breaking shoe which comprises a first advanced section having a leading edge and a second trailing bead-breaking section having a leading edge, said second bead-breaking section being inclined to said first section whereby said second section meets said wheel rim at an angle and is movable thereover said leading edge having a radius larger than the radius of the largest wheel rim diameter contemplated to be serviced by the machine and having a center of curvature which is disposed on the side of the center of curvature of the rim being serviced which is remote from the leading edge.

8. A bead-breaking shoe as claimed in claim 7 wherein said leading edges of said first and second portions define a continuous curve.

9. A bead-breaking shoe as claimed in claim 8 wherein said leading edge of said bead-breaking shoe upon movement has a locus which defines an arc of a cylinder inclined to a cylinder of the wheel rim, the centres of said cylinders intersecting.

10. A bead-breaking shoe as claimed in claim 7 wherein said leading edge of said first section is inclined at an angle in the range of between 50° and 60°.

11. Apparatus for breaking the bead of a tire mounted on a wheel rim having a drop center which comprises in combination a wheel rim supporting platform having a maximum radius at the lower portion thereof; means engageable with an inside of said wheel rim for securing said wheel rim; a shoe support arm; power means for moving said support arm towards said wheel rim platform; and a bead-breaking shoe mounted on said bead-breaking support arm in bead-breaking attitude; said bead breaking shoe comprising a leading edge on the bead breaking shoe disposed adjacent to the supporting platform and having a radius of curvature which is larger than said supporting platform maximum radius, said leading edge having a center of curvature which is on the side of said wheel rim supporting platform center of curvature which is remote from said leading edge, an inwardly and upwardly sloping upper surface on the bead breaking shoe having a radius of curvature less than the maximum radius of the supporting platform, whereby the lateral edges of the shoe ride on the supporting platform when moved by the power means and the center portion of the shoe is spaced from the platform.

12. Apparatus as claimed in claim 11 wherein said leading edge moves over said wheel rim at an angle thereto.

13. Apparatus as claimed in claim 12 wherein said bead-breaking shoe is pivotally mounted on said shoe support arm.

14. Apparatus as claimed in claim 12 or 13 further including adjustment means for varying the attitude of said bead-breaking shoe.

15. Apparatus as claimed in claim 13 wherein a framework is provided to support said rim supporting platform, and wherein said power means is pivotally connected at one end to said support arm on a side outward of said mounting of said bead-breaking shoe, together with means for pivotally connecting the other end of said power means to said framework.

16. In combination with a tire changing machine having a framework, a bead breaker lever pivotally connected to the framework, a driver coupled to pivotally move the bead breaker lever, a bead breaker shoe pivotally attached to the bead breaker lever, and a wheel rim support table mounted on the framework to receive and support wheel rims thereon and being positioned so that the bead breaker shoe is reciprocally driven past the support table by the driver, the improvement comprising an inwardly and upwardly sloping support surface on the rim support table having a maximum radius at the lower edge thereof,
a leading edge on the bead breaker shoe disposed adjacent to said support surface and having a radius of curvature which is larger than said support surface maximum radius and having a center of curvature which is disposed on the side of the rim support table center of curvature remote from said leading edge,
an inwardly and upwardly sloping upper surface on the bead breaker shoe having a radius of curvature in a plane normal to said upper surface which is less than said maximum radius of said support surface,
so that the lateral extremities of the shoe may ride on said support surface and the center of said shoe leading edge is spaced therefrom.

17. The combination of claim 16 together with a member mounted on the bead breaker lever, and an adjustment screw disposed to be extended from and retracted within said member and to contact said bead breaker shoe so that the spacing of the center of said shoe leading edge from said support surface may be adjusted.

18. The combination of claim 16 further comprising,
means for connecting the driver to the bead breaker lever at a distance from the lever and framework pivotal connection which is greater than the distance from the lever and bead breaker shoe pivotal connection to the lever and framework connection.

19. The combination of claim 16 wherein said leading edge is smoothly rounded and said upper shoe surface proximate to said leading edge is polished.

20. In combination with a tire changing machine having a framework, a bead breaker lever pivotally connected to the framework, a lever driver coupled to move the lever about the pivotal connection, a bead breaker shoe pivotally attached to the bead breaker lever at a position thereon spaced from the pivotal connection, a wheel rim support table mounted on the framework in a position so that the bead breaker shoe is driven in reciprocal motion past the support table by the driver, the improvement comprising, means for pivotally connecting one end of the lever driver to the framework, and
means for connecting the other end of the lever driver to the lever at a distance from the frame and lever pivotal connection which is greater than the distance between the frame and lever connection and the position on the lever where the bead breaker shoe is attached, said rim support table having an inwardly and upwardly sloping surface with a maximum radius at the lower portion thereof, wherein the bead breaker shoe comprises
a leading edge disposed adjacent to the table sloping surface having a radius of curvature larger than the sloping surface maximum radius and having a center of curvature which is disposed on the side of the rim support table center of curvature remote from said leading edge, and
an inwardly and upwardly sloping upper surface having a radius of curvature which is less than the support table sloping surface maximum radius whereby the lateral extremities of the shoe may contact and move along the table sloping surface while the center of said leading edge is spaced therefrom.

21. The combination of claim 20 further comprising a smooth rounded surface on said leading edge and a polished area on said shoe upper surface proximate to said leading edge.

* * * * *